United States Patent
Donatti et al.

(10) Patent No.: US 6,902,758 B2
(45) Date of Patent: Jun. 7, 2005

(54) APPLICATOR AND METHOD FOR IN-MOLD COATING

(75) Inventors: Joseph T. Donatti, Howell, MI (US); Andrew P. Mellentine, Owosso, MI (US); Glenn D. Williams, Holly, MI (US)

(73) Assignee: Lear Corporation, Southfield, MI (US)

( * ) Notice: Subject to any disclaimer, the term of this patent is extended or adjusted under 35 U.S.C. 154(b) by 262 days.

(21) Appl. No.: 10/115,360

(22) Filed: Apr. 3, 2002

(65) Prior Publication Data

US 2003/0190411 A1 Oct. 9, 2003

(51) Int. Cl.[7] .............................. B05D 1/02; B05D 7/22
(52) U.S. Cl. .................... 427/133; 427/236; 427/407.1; 427/421.1; 427/427.3; 427/427.4
(58) Field of Search ................................ 427/133, 135, 427/236, 421, 407.1, 427.3, 427.4, 421.1; 264/309

(56) References Cited

U.S. PATENT DOCUMENTS

| | | | | |
|---|---|---|---|---|
| 2,968,083 A | * | 1/1961 | Lentz et al. | 264/30 |
| 3,799,445 A | * | 3/1974 | Marino | 239/242 |
| 4,443,177 A | | 4/1984 | Modur et al. | |
| 4,687,531 A | * | 8/1987 | Potoczky | 156/245 |
| 4,798,341 A | | 1/1989 | Gimple | |
| 4,917,300 A | | 4/1990 | Gloviak et al. | |
| 5,098,024 A | | 3/1992 | MacIntyre et al. | |
| 5,294,057 A | * | 3/1994 | Hamilton | 239/417.3 |
| 5,415,692 A | * | 5/1995 | Fujita et al. | 118/317 |
| 5,423,488 A | | 6/1995 | Filion et al. | |
| 5,429,682 A | | 7/1995 | Harlow, Jr. et al. | |
| 5,435,491 A | | 7/1995 | Sakuma | |
| 5,595,346 A | | 1/1997 | Haruch et al. | |
| 5,601,641 A | * | 2/1997 | Stephens | 106/38.25 |
| 5,662,996 A | * | 9/1997 | Jourquin et al. | 428/318.8 |
| 5,785,252 A | * | 7/1998 | Keim et al. | 239/418 |
| 5,885,662 A | | 3/1999 | Gardner, Jr. | |
| 5,971,732 A | | 10/1999 | Grisch et al. | |
| 6,010,084 A | | 1/2000 | Yoshida et al. | |
| 6,068,813 A | * | 5/2000 | Semel | 419/66 |
| 6,071,619 A | * | 6/2000 | De Winter | 428/423.1 |
| 6,086,813 A | * | 7/2000 | Gruenwald | 264/460 |
| 6,093,449 A | * | 7/2000 | Carter et al. | 427/233 |
| 6,192,968 B1 | * | 2/2001 | Renkl et al. | 164/121 |
| 6,328,799 B1 | | 12/2001 | Inoue et al. | |

FOREIGN PATENT DOCUMENTS

| | | |
|---|---|---|
| EP | 90200429.0 A1 | 2/1990 |
| EP | 90200429.0 B1 | 2/1990 |

* cited by examiner

*Primary Examiner*—Kirsten Jolley
(74) *Attorney, Agent, or Firm*—Bill C. Panagos

(57) ABSTRACT

An in-mold applicator and method for spraying a coating on difficult-to-reach surfaces of a mold is disclosed. The applicator includes a spray head and a base portion at an oblique angle to each other. The outer dimensions of the body portion and the spray head are sufficiently small so that taken in combination with the oblique angle, the applicator and method can enhance the spraying of the coating to difficult-to-reach surfaces within the mold.

10 Claims, 5 Drawing Sheets

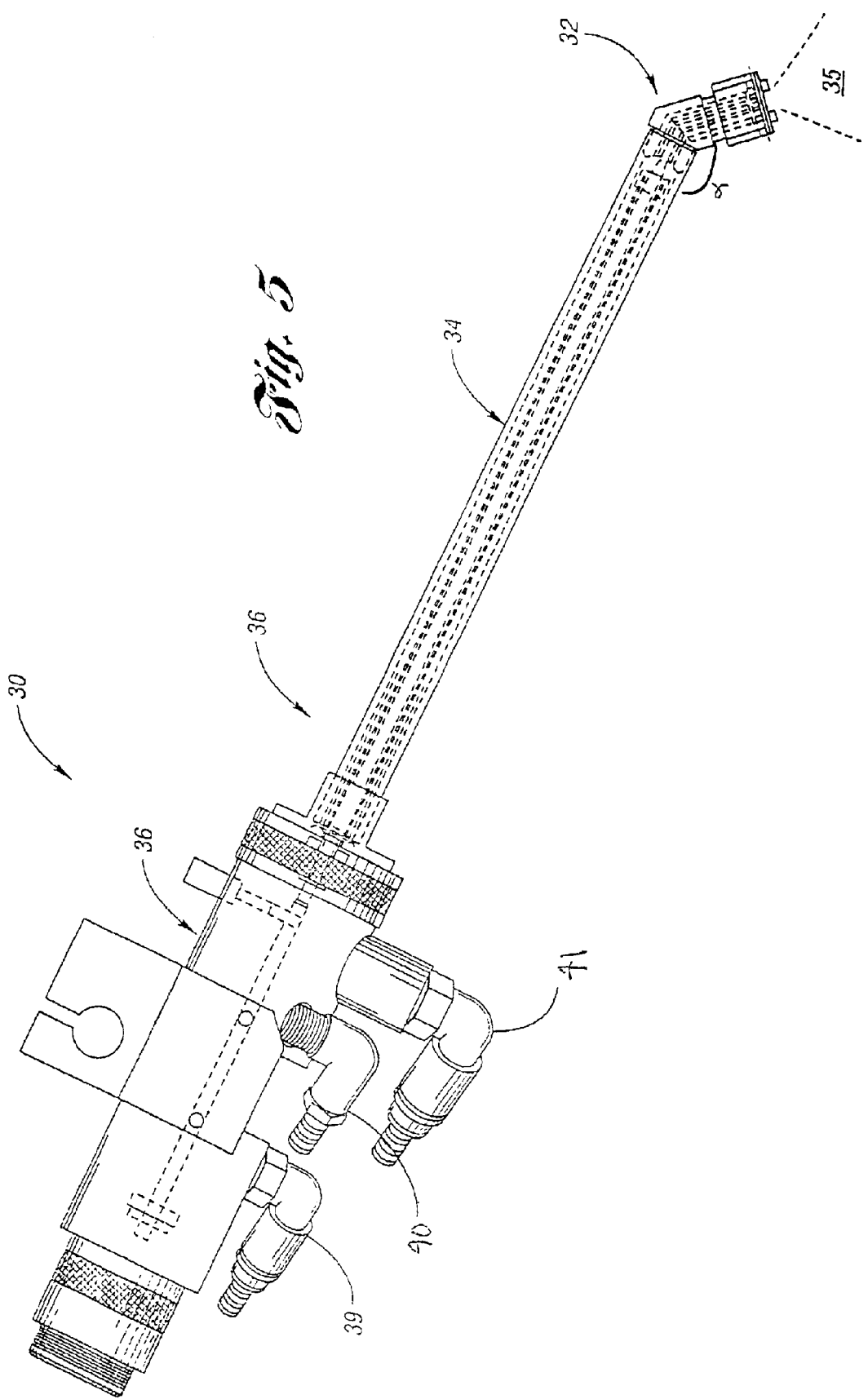

APPLICATOR AND METHOD FOR IN-MOLD COATING

BACKGROUND OF THE INVENTION

1. Field of the Invention

The present invention relates to an improved nozzle for use with in-mold coating processes.

2. Background Art

In-mold coating processes are used in a number of applications to spray, or otherwise apply, coatings onto the working surfaces of molds used in molding operations. One common application of in-mold coating can be found in the processes used for manufacturing the soft interior paneling of automotive vehicles, like the soft interior paneling of an instrument panel dashboard 10, shown in cross-section in FIG. 1. Instrument panel 10 can be manufactured by a skin making process or a foam-in-the-mold process that each include spraying a mold, like mold 12 shown in FIG. 2, with a coating such as a one or two component waterborne acrylic, or a one component or two component urethane, or other material. The material hardens to form a relatively thin covering 14, generally 0.80 to 1.20 millimeters, which is used as a finished coating for a final color and gloss for appearance and UV-resistance to sunlight. In the case of skin making, skin 14 is removed from mold 12 for application to foam material 16 at another location. The foam-in-the-mold process is similar to the skin making process, except foam material 16 is applied to the skin 14 by a foam injection device (not shown) while the skin is in mold 12, instead of at a different location like the skin making process.

Referring to FIG. 1, the skin 14 includes a curvilinear or arcuate rim portion 18 extending along the outer periphery of skin 14 for gripping foam material 16. To form curvilinear rim portion 18, or other edges and flats that bend away from the outer surface of the skin and roll back over towards the center of the skin, an undercut mold portion 20 is needed within mold 12, as shown in FIG. 2. The undercut mold portion 20 is a difficult-to-reach area for applying the coating. In the past, a collinear applicator 22 has been used to apply the coating to form skin 14. For example, the collinear applicator 22 is mounted to a robot 24 and moved around working surfaces 13 to spray coating onto mold 12. As shown in FIG. 3, mold opening 26 somewhat prevents direct viewing of undercut portion 20 from outside of mold 12. Accordingly, those areas in mold 12 which are not directly viewable from outside mold 12, like undercut portion 20, are difficult for collinear applicator 22 to squarely spray with the coating. Thus, such areas are considered difficult-to-reach areas of mold 12.

As it is difficult for collinear applicator 22 to reach the difficult-to-reach areas, additional measures are required to manufacture skin 14 with collinear applicator 22. For example, since collinear applicator 22 cannot squarely spray undercut portion 20 (in order to squarely spray a surface, the surface must be within a width of a fan spray pattern of the applicator), the methods which use collinear applicator 22 must either coat the uncoated areas in a secondary operation, which usually consists of a human operator using a spray gun, or coat around the uncoated areas with excessive amounts of coating material so that the material can run down the sides of mold 12 to the difficult-to-reach surfaces. It is expensive, however, to have operators coat the uncoated portions in a secondary operation, and it is similarly expensive to apply excess material to the mold. Moreover, the excess coating can cause additional problems in bi-color applications in which it is desirable to have one portion of the skin coated with a first color and another portion of the skin coated with a second different color, as the running of coating material from one color into the other color can discolor the appearance of the skin.

SUMMARY OF THE INVENTION

It is an object of the present invention to provide an improved applicator and method for coating difficult-to-reach in-mold portions of a mold cavity in one coating operation and without requiring excessive amounts of coating.

In accordance with one aspect of this invention, an in-mold applicator for spraying a coating on difficult-to-reach surfaces of a mold is disclosed. The in-mold applicator includes a spray head and body portion at an oblique angle to each other. The body portion and spray head have outer dimensions that are sufficiently small in combination with the oblique angle to enhance the spraying of the coating onto the difficult-to-reach surfaces of the mold.

In accordance with another aspect of the present invention, an in-mold applicator is disclosed for spraying a coating on a first difficult-to-reach undercut surfaces of a mold. The in-mold applicator includes a body portion and a spray head extending at an oblique angle with respect to the body portion. The body portion and spray head have outer dimensions that are sufficiently small in combination with the oblique angle to enhance the spraying of the coating to the undercut surface. Furthermore, each of the spray head and the body portion have a central passageway for delivering a liquid medium and an outer passageway surrounding the central passageway for delivering a gaseous medium. The applicator still further includes a liquid medium head joining the central passageways in liquid medium flow relationship proximate the oblique angle. In addition, the applicator includes a closable and openable liquid medium valve within the liquid medium head for selectively controlling a sufficient flow of liquid medium through the liquid medium head for atomization with the delivered gaseous medium.

In accordance with still another aspect of the present invention, a method is disclosed for spraying a coating on a mold having a first difficult-to-reach undercut surface which is not directly visible from an external view of the mold. The method includes spraying a first atomized fluid onto the mold including the undercut surfaces from an applicator having a body portion and a spray head extending at an oblique angle with respect to the body portion. The body portion and the spray head having a configuration that is sufficiently small in combination with the oblique angle such that the spray head is positionable within the mold in a head-on position sufficient to squarely spray the atomized fluid onto the mold and the first undercut surface.

BRIEF DESCRIPTION OF THE DRAWINGS

FIG. 5 is a perspective view of the applicator and robot adaptor in accordance with the present invention;

DETAILED DESCRIPTION OF THE PREFERRED EMBODIMENTS

Figure 1:
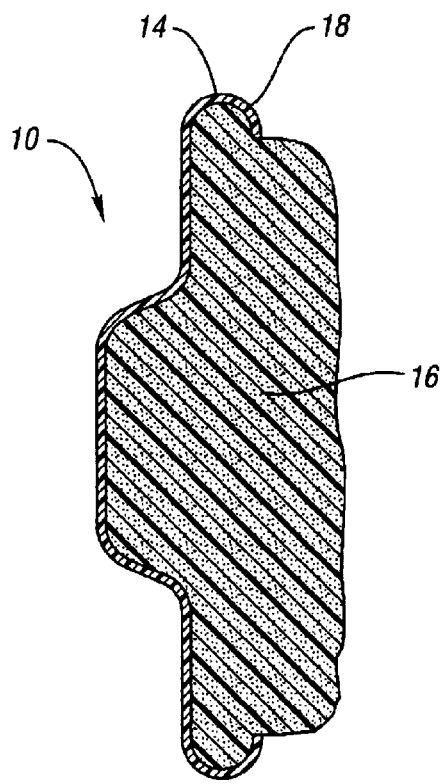
FIG. 1 is a fragmentary cross-sectional view of a instrument panel dashboard covering.
Figure 2:
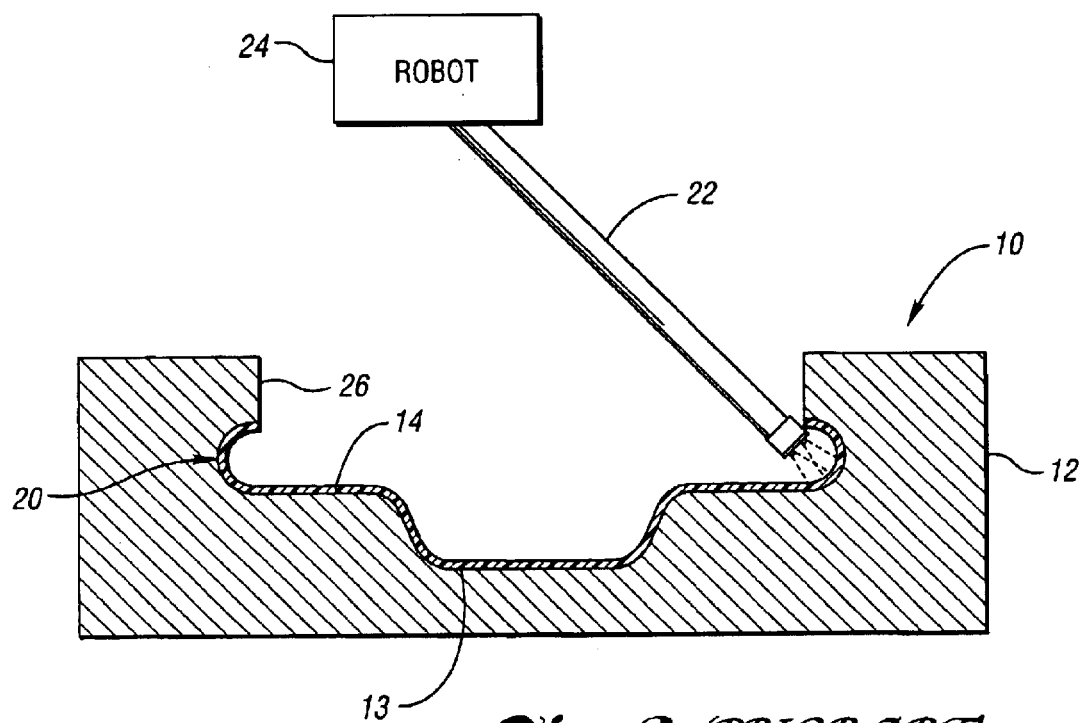
FIG. 2 is a schematic cross-sectional view of a prior art mold and collinear applicator used for molding the instrument panel shown in FIG. 1.
Figure 4:
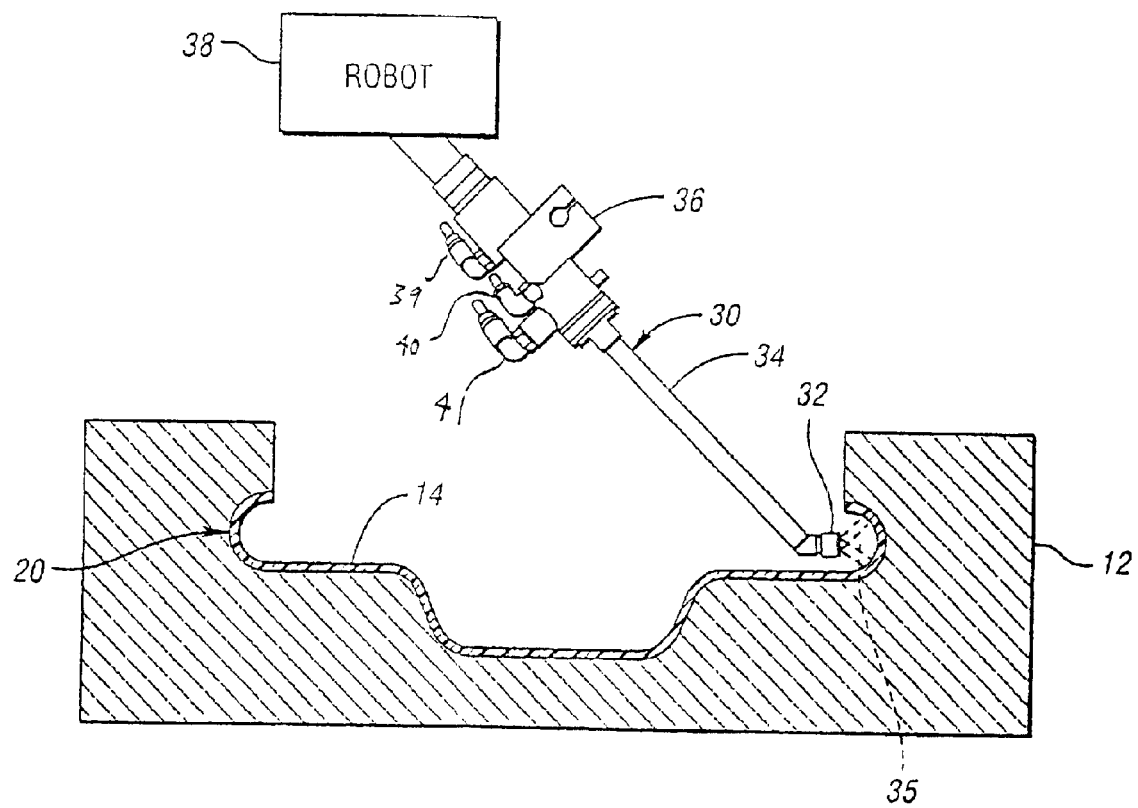
FIG. 4 is a cross-sectional view of the prior art mold of FIG. 1 and an applicator, according to the invention, attached to a robot adaptor.

FIG. 4 shows an improved applicator device or applicator, according to the invention, for applying a coating to mold 12. The applicator of the invention is hereinafter referred to with reference numeral 30, and can be used in any number of applications in which it is desirable to spray a coating onto a mold. One area of interest is in processes used to manufacture soft interior components for automotive vehicles, like the skin making process and foam-in-the-mold process used to manufacture instrument panel 10 shown in cross-section in FIG. 1. As described above, instrument panel 10 can be manufactured by spraying mold 12 with a coating such as polyurethane, polyvinylchloride, or other material to form a relatively thin covering type skin 14 that forms a covering panel for covering a soft foam material 16.

In either the skin making process or the foam-in-the-mold process, the applicator 30 may deliver either waterborne or solvent-borne, one component or two component, coatings for providing "Class A" surface color matches. The coatings may be delivered, for example, at 300 cubic centimeters per minute with a variable fan width from 38 to 102 millimeters at a distance of 102 millimeters from the surface being coated. In addition, the applicator 30 may be capable of delivering 50 cubic centermeters per minute of mold release agents, either waterborne or solvent-borne, with the same fan width viscosities of 22 to 30 seonds using a number 3 Zahn cup.

In general, the molding processes broadly includes a first step of spraying a mold release onto a mold, a second step of applying a skin forming material to the mold, after the mold release has had time to evaporated, or flash, its volatile elements, and a third optional step of injecting a foam material into the mold, after the skin forming material has had time to evaporated, or flash. (Flash is a term of art which references the time required for the volatile elements used to liquify the skin forming material to evaporate, typically the volatile element is water but it could also be any other soluble additive.) The novel interaction of applicator 30 with these broad steps is described below in greater detail.

Common in-mold applications require skin 14 to have a curvilinear rim portion 18 extending along a portion of the outer periphery of skin 14 for gripping foam material 16. To form curvilinear rim portion 18, or other similar edges and flats which, for example, bend away from an outer surface of the skin 14 and extend inwardly, an undercut mold portion, like undercut portion 20 shown in FIG. 4, is needed within mold 12. While the undercut portion 20 is shown as a curvilinear portion, the undercut portion 20 may be any difficult-to-reach portion of mold 12, like a straight edge or aperture.

Figure 3:
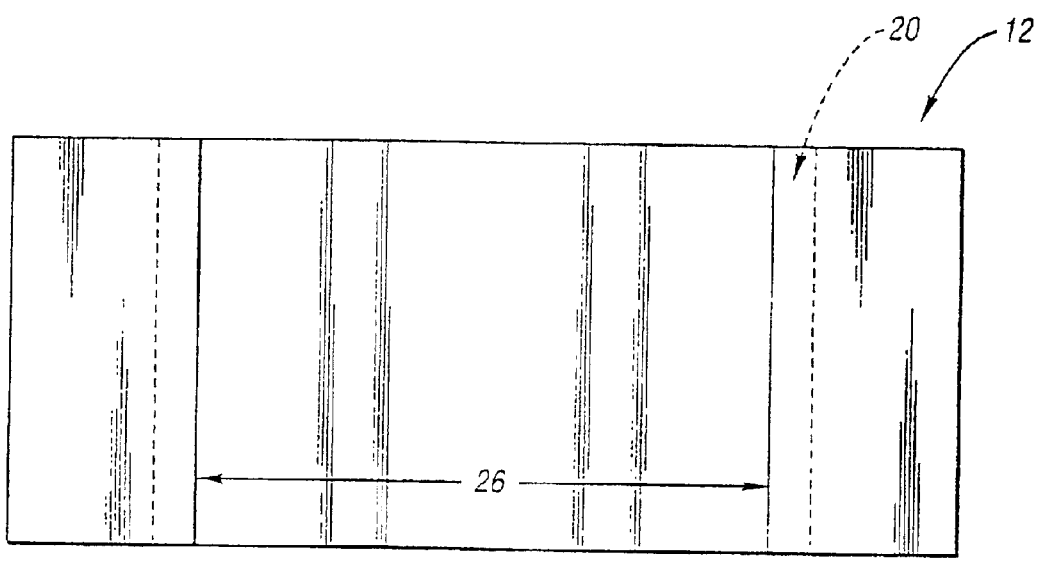
FIG. 3 is an elevational view of the mold shown in FIG. 2, showing the portions of the mold that are directly viewable from outside the mold.

As shown in FIG. 3, mold opening 26 substantially prevents direct viewing of undercut portion 20 from outside of mold 12. Accordingly, those areas in mold 12 which are not directly viewable from outside mold 12, like undercut portion 20, are difficult for line of sight devices to reach. Accordingly, those areas within mold 12 which are not directly viewable through mold opening 26 by an external viewer are referred to as difficult-to-reach areas of mold 12, like undercut portion 20.

Figure 6:
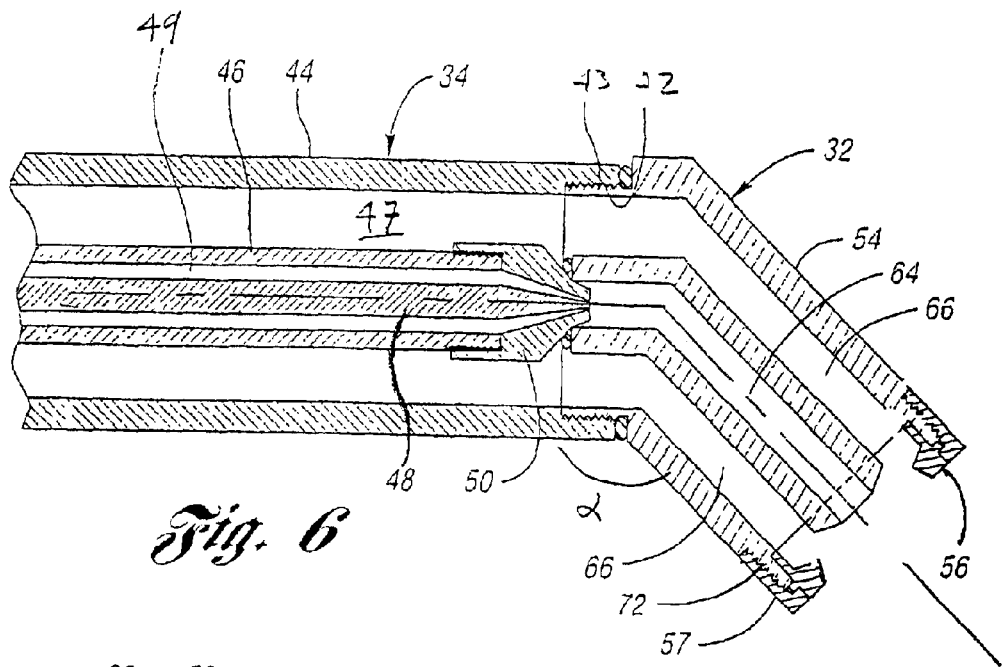
FIG. 6 is a cross-sectional view of the applicator of FIG. 5, wherein the applicator includes a spray head and a body portion at an oblique angle to each other, and the spray head includes a spray cap.

Referring to FIG. 5, the invention is directed to an improved apparatus and process for coating difficult-to-reach surfaces of mold 12. As such, in the following detailed description, it becomes apparent that the applicator 30 turns the once difficult-to-reach surfaces into easy-to-reach surfaces. Applicator 30 can reach undercut surface 20, because it is relatively small and includes a spray head 32 and a body portion 34 that are at an oblique angle α to each other. While spray head 32 may have any suitable dimension or configuration, in one embodiment the dimensions for the diameter of spray head 32 are in the range of 0.500 inch to 1.500 inches. In the embodiment of FIG. 6, spray head 32 has a diameter of 0.500 inches. In addition, while the length of spray head 32 may be any have any suitable dimension or configuration, in one embodiment the dimensions for the length of spray head 32 are in the range of 0.750 to 1.500 inches. In the embodiment shown in FIG. 6, the dimension for the length of spray head 32 is 1.000 inches. Furthermore, while body portion 34 may have any suitable dimension or configuration, in one embodiment the dimensions for the diameter of body portion 34 is in the range of 0.250 to 0.750 inches. In the embodiment of FIG. 6 the dimension of the diameter of body portion 34 is 0.500 inches. In addition, while the length of body portion 34 may have nay suitable dimension or configuration, in one embodiment the dimensions for the length of body portion 34 are in the range of 4 to 18.000 inches. In the embodiment of FIG. 5, the dimension of the length of body portion 34 is 10.000 inches. The oblique angle α is greater than 0 degrees and less than 180 degrees. In one embodiment, the oblique angle α is in the range of 120 to 150 degrees. In the embodiment shown in FIG. 5, the angle α is approximately 135 degrees. Accordingly, the dimensioning of applicator 30 is sufficiently small for coating difficult-to-reach undercut surfaces 20 within mold 12.

As shown in FIG. 4, applicator 30 can position itself within mold 12 for applying a coating squarely to undercut portion 20. With spray head 32 at an angle, spray head 32 can direct a spray fan pattern 35 into difficult-to-reach undercut surfaces 20 of mold 12. In one embodiment, spray head 32 is positionable to squarely spray the coating onto mold 12 by having at least a portion of the width of spray head fan pattern 35 in-line with undercut portion 20 to strike undercut portion 20 in a head-on manner.

Applicator 30 also includes an adaptor 36 to operatively interconnect body portion 34 to a robot 38. While adaptor 36 may have any suitable dimension or configuration, in one embodiment the dimensions for the breadth squared adaptor 36 are in the range of 0.500 inch to 3.00 inches in width. In the embodiment of FIG. 5, adaptor 36 has a breadth of 2 inches. In addition, the length of adaptor 36 may be any have any suitable dimension or configuration, but in one embodiment the dimensions for the length of adaptor 36 are in the range of 2.000 to 6.000 inches. In the embodiment shown in FIG. 5, the dimension for the length of adaptor 36 is 4.000 inches. The robot 38 positions applicator 30 in and around mold 12 to apply the coating thereupon. Adaptor 36 can be configured to work with any type of robot, including multiaxis robots, such as 6-axis and 7-axis robots that are commonly used for in-mold coating applications. Furthermore, applicator 36 and includes three valves 39, 40, and 41, described below in greater detail.

The angled spray head 32 allows applicator 30 to coat difficult-to-reach surfaces in molding applications without having to apply excess coating material, and/or without requiring a manual, secondary operation. Consequently, the applicator 30 minimizes the amount of coating material required. Furthermore, use of the applicator 30 allows designers and manufacturers to produce complex parts having numerous complex surfaces and features once thought to be too expensive to manufacture because of all the secondary operations required to coat corresponding undercut surfaces, or other difficult-to-reach surfaces, of a mold.

Referring to FIG. 5, body portion 34 and adaptor 36 work in combination with the spray head 32 to enhance the ability of applicator 30 to perform unique movements. To begin with, spray head 32, body portion 34, and adaptor 36 are threadably interconnected. For example, there are situations in which the mold 12 can have first and second undercut surfaces, where the second undercut surface is more difficult-to-reach for a first spray head 32 used to coat the first difficult-to-reach surface. Accordingly, a second spray head 32, having either a different spray pattern or a different oblique angle, can be threaded to the body portion 34, either by hand or with machine movement, for coating the second difficult-to-reach undercut portion. Consequently, time is saved when swapping spray heads, and the ability to coat multiple difficult-to-reach surfaces improves design flexibility. Likewise, when multiple color coatings are desired, the body portion 34, and thereby the spray head 32 attached thereto, can be threadably removed from the adaptor 36 and exchanged for another body portion 34 so that the color from the first body portion does not infect the second body portion. Again, these components may be removed and exchanged manually or automatically. For example, a robotic system including a shunt action robotic arm can be used to exchange various components for others located nearby for coating one mold, or a number of molds passing thereby.

The particular elements for achieving the foregoing results will now be described in greater detail. Referring to FIG. 6, spray head 32 and a segment of body portion 34 are shown with greater detail. As shown, spray head 32 is secured to body portion 34 by threadably interconnecting first spray head threads 42 with first body threads 43.

Body portion 34 generally refers to a number of components, including outer tube 44, inner tube 46, liquid medium needle valve 48, and liquid medium head or tip 50. The configuration shown is one of the many arrangements which may be used in combination with the teachings of this invention, and is not in any way intended to limit the scope of this invention. As shown, outer tube 44 generally surrounds inner tube 46 and liquid medium tip 50. The liquid medium tip 50 and inner tube 46 connect with each other to surround liquid medium needle valve 48. This arrangement forms a passageway between outer tube 44 and inner tube 46, referred to as outer body passageway 47, and another passageway between inner tube 46 and liquid medium needle valve 48, referred to as central body passageway 49.

Figure 7:
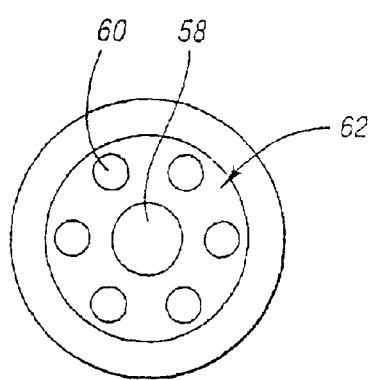
FIG. 7 is an end view of the spray head shown without the spray cap.
Figure 8:
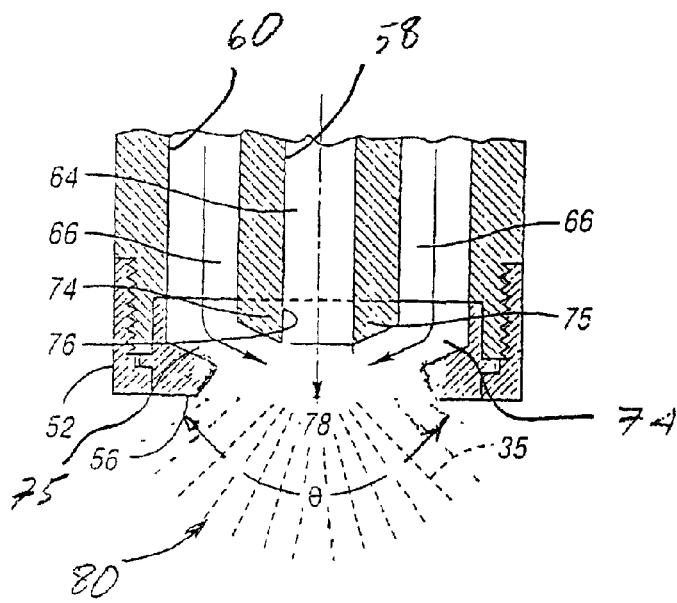
FIG. 8 is an enlarged fragmentary sectional view of the spray cap shown in FIG. 5.

Spray head 32 generally refers to a number of components, including spray head angled body portion 54, spray cap 56, and spray cap lock 57. As shown in FIG. 7, spray head angled body portion 54 includes a center aperture 58, a number of outer apertures 60, and a spray cap cavity 62. As shown in FIG. 8, the apertures 58 and 60 define a central spray head passageway 64 and a plurality of outer spray head passageways 66.

When spray head 32 is secured to body portion 34, central body passageway 49 is joined with central spray head passageway 64, and outer body passageway 47 is joined with the plurality of outer spray head passageways 66. As described above, adaptor 36 includes three valves 39, 40, and 41. The valves 39, 40 and 41 deliver fluid from robot 38 to applicator 30. Referring to FIG. 5, one valve, such as valve 39, delivers a gaseous medium to outer body passageway 47, and thereby, to the plurality of outer spray head passageways 66. A second valve, such as valve 40, delivers a liquid medium to central body passageway 49, for delivery through liquid medium tip 50 and into central spray head passageway 64. The liquid flow through liquid medium tip 50 is regulated by a third valve, such as valve 41, which delivers a gas from an outside source for controlling an actuating device (not show, but located in adaptor 36) for causing reciprocating action of liquid medium needle valve 48. The needle valve 48 is closable to shut-off the flow of liquid to spray head central passageway 64 and selectively openable to control the flow of liquid to spray head central passageway 64. Uniquely, both a liquid and gas are deliverable to spray head 32 for spraying a coating on mold 12 with only three valves, whereby the necessity of using a fourth valve for controlling the spraying of the atomized fluid is eliminated by controlling the spraying of the atomized fluid by controlling only the liquid flow and atomization gas flow.

Figure 9:
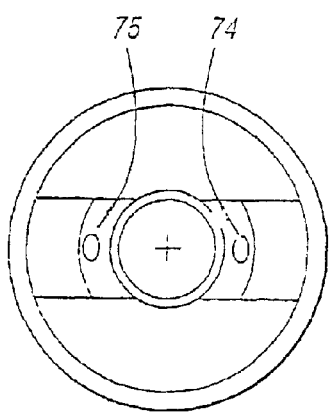
FIG. 9 is an end view of the spray cap.
Figure 10:
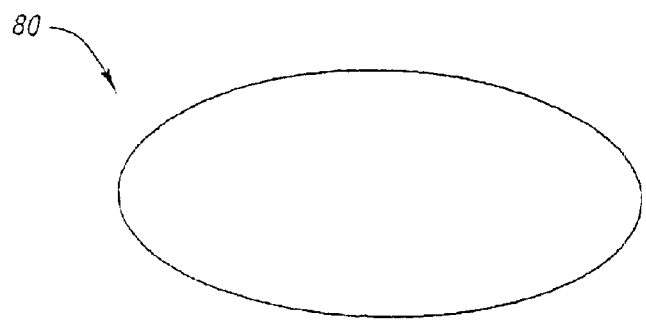
FIG. 10 illustrates a fan spray profile provided by the spray cap.

Referring to FIG. 8, an enlarged view of spray cap 56 allows for better description of the atomization process for spray head 32. Spray cap 56 inserts into spray cap cavity 62, and is secured to spray head angled body portion 54 by spray cap lock 57, which is threadably secured to an second spray head threaded portion 72. Spray cap 56 includes two angled, or curved, apertures 74 and 75, shown also in the end view of FIG. 9, for mixing the gaseous medium from the plurality of outer spray head passageways 66 with the liquid medium expelling through central cap aperture 76 from central spray head passageway 64. The liquid and gas collide with one another and atomize in cap opening 78 to form spray fan pattern 35. The pressures of each of the fluids and the angle of angled apertures 74 and 75 in combination determine spray fan angle θ and spray fan profile 80. Profile 80 is shown in greater detail in FIG. 10. In one embodiment, spray fan angle θ is 45 degrees. In another embodiment spray fan angle θ may be in the range of 30 to 60 degrees. In the embodiment of FIG. 8, spray fan angle θ is 90 degrees. Spray fan profile 80 is ellipsoid, but it may be circular or any other suitable configuration. Advantageously, spray cap 56, like body portion 34 and spray head 32, can be removed and replaced into spray head angled body portion 54 by hand or machine operation.

Figure 11:
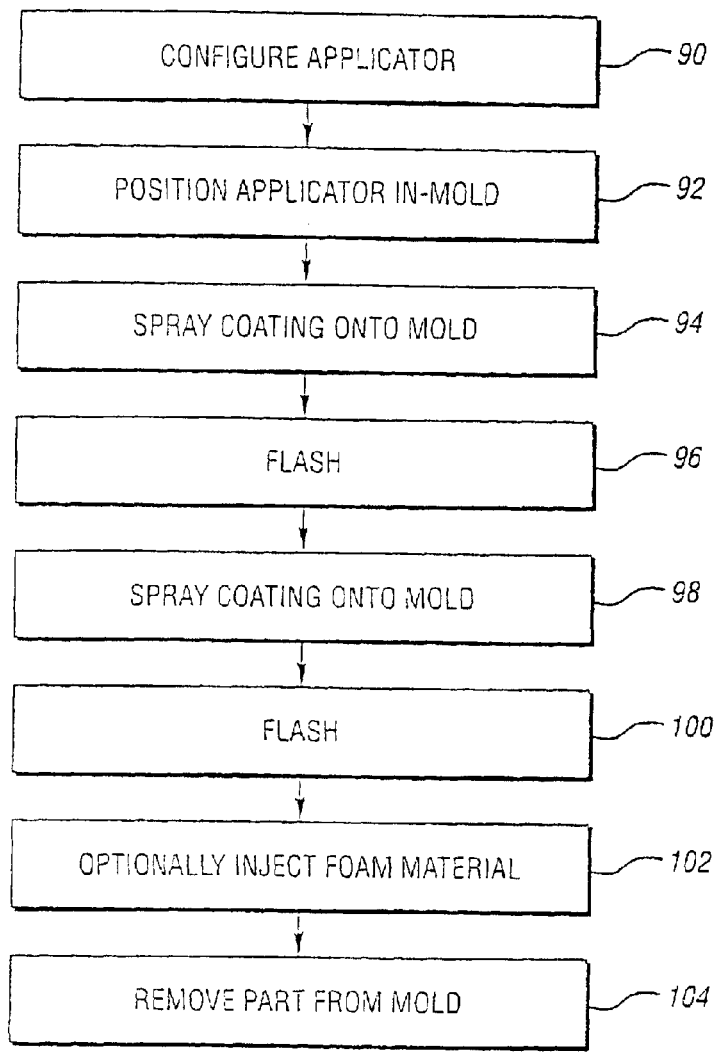
FIG. 11 is a flowchart depicting an improved method for spraying a coating on a mold according to the invention.

FIG. 11 illustrates operation of an in-mold method for spraying a coating on difficult-to-reach surfaces of mold 12 for manufacturing a skin or a foam-in-the mold covering. At step 90, applicator 30 is configured with an oblique angle interconnecting spray head 32 and body portion 34. At step 92, applicator 30 is positioned within mold 12, for either a skin molding or foam-in-the-mold process at a location for the applicator 30 to squarely spray a coating on difficult-to-reach surface 20. At step 94, a first coating, such as a mold release agent, is sprayed onto mold 12, including the difficult-to-reach surface 20. At step 96, the mold release agent supplied in step 94 is allowed to flash for a predetermined period of time. At step 98, a second coating is applied to the mold 12. The second coating may be any suitable material, such as an acrylic or polyurethane. At step 100, the material sprayed in step 98 is allowed to flash for a predetermined period of time. Optionally, at step 102, a foam material is injected into mold 12 by a foam injecting device (not shown). Finally, at step 104 the skin or foam-in-the-mold covering is removed from mold 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for spraying a coating on a mold, the mold having a first difficult-to-reach undercut surface which is not directly visible from an external view of the mold, the method comprising:

providing an applicator having a body section and a spray head, the spray head having an angled body portion and a non-angled portion such that the spray head defines a fixed oblique angle between the angled and non-angled portions, the spray head having threads on the non-angled portion for threadably securing to threads on the body section, the body section and spray head having outer dimensions sufficiently small in combination with the oblique angle to enhance spraying of the coating onto the difficult-to-reach surfaces of the mold, the body section and spray head each including a central passageway for delivering a liquid medium and an outer passageway surrounding the central passageway for delivering a gaseous medium, the spray head further including a spray cap secured to an outlet end of the spray head by a spray cap lock, the spray cap lock having threads for securing to threads on the spray head, the spray cap lock defining an outer boundary of the spray head;

atomizing a fluid by providing the gaseous medium to the outer passageway and the liquid medium to the central passageway of the body portion such that the liquid medium collides with the gaseous medium inside the outer boundary defined by the spray cap lock; and positioning the spray head to spray the atomized fluid within the mold in a head-on position sufficient to squarely spray the atomized fluid onto the mold and the first undercut surface.

2. The method of claim 1 wherein the head-on position for squarely spraying the first atomized fluid on the first undercut surface locates a spray fan pattern of the first atomized fluid to sufficiently strike the first undercut surface with sufficient accuracy for reducing the likelihood of the first undercut surface receiving an inadequate amount of coating to sufficiently coat the first undercut surface.

3. The method of claim 1 wherein the first atomized fluid is a mold release agent.

4. The method of claim 3 further comprising spraying a second atomized fluid onto the first undercut surface from the applicator, the second atomized fluid comprising a polyurethane.

5. The method of claim 4 further comprising replacing the spray head with a second spray head that extends at a different oblique angle with respect to the body portion.

6. The method of claim 5 wherein the different oblique angle is in the range of 30 to 60 degrees.

7. The method of claim 5 further comprising using the second spray head to coat a second difficult-to-reach undercut surface that is different from the first difficult-to-reach undercut surface.

8. The method of claim 1 wherein the oblique angle is 135 degrees.

9. The method of claim 1 wherein the first atomized fluid is for skin making.

10. The method of claim 1 wherein the oblique angle is less than 90 degrees.

* * * * *